United States Patent [19]
Van Helleputte et al.

[11] Patent Number: 6,057,895
[45] Date of Patent: May 2, 2000

[54] PLASMAS ADDRESSED LIQUID CRYSTAL DISPLAY WITH DEPOSITED PLASMA CHANNELS WITH TAPERED EDGES

[75] Inventors: Henri R. J. R. Van Helleputte; Jacob Bruinink; Adrianus L. J. Burgmans, all of Eindhoven; Petrus F. G. Bongaerts, Waalre, all of Netherlands; Babar A. Khan, Ossining, N.Y.; Karel E. Kuijk, Dommelen, Netherlands

[73] Assignee: Philips Electronics North America Corporation, New York, N.Y.

[21] Appl. No.: 08/535,697

[22] Filed: Sep. 28, 1995

[51] Int. Cl.⁷ ..................................................... G02F 1/133
[52] U.S. Cl. ................................ 349/32; 445/24; 438/30; 349/187
[58] Field of Search ............................ 349/32, 156, 139, 349/187; 345/60; 216/40; 315/169.4; 313/491, 493, 586, 244, 246, 252; 438/30, 670; 445/24

[56] References Cited

U.S. PATENT DOCUMENTS

| | | | |
|---|---|---|---|
| 4,224,361 | 9/1980 | Romankiw | 427/259 |
| 4,896,149 | 1/1990 | Buzak et al. | 340/794 |
| 5,077,553 | 12/1991 | Buzak | 340/794 |
| 5,214,521 | 5/1993 | Kwon et al. | 359/54 |
| 5,221,979 | 6/1993 | Kim | 349/32 |
| 5,244,427 | 9/1993 | Umeya | 445/24 |
| 5,272,472 | 12/1993 | Buzak | 345/60 |
| 5,276,384 | 1/1994 | Martin | 313/582 |
| 5,346,803 | 9/1994 | Hanrahan et al. | 430/7 |
| 5,349,454 | 9/1994 | Iwama | 359/54 |
| 5,351,144 | 9/1994 | Tanamachi | 359/54 |
| 5,377,029 | 12/1994 | Lee et al. | 359/54 |
| 5,453,660 | 9/1995 | Martin et al. | 313/582 |
| 5,519,520 | 5/1996 | Stoller | 349/32 |

OTHER PUBLICATIONS

Buzak et al, "A 16–Inch Full Color Plasma Addressed Liquid Crystal Display", Digest of Tech. Papers, 1993 SID Int. Symp., Soc. for Info. Displ. pp. 883–886.

*Primary Examiner*—Kenneth Parker
*Attorney, Agent, or Firm*—John C. Fox

[57] ABSTRACT

A flat display device preferably of the PALC type in which the plasma channels are formed by depositing successive layers of electrically conductive and electrically insulating material on a substrate containing spaced walls of a resist material that are preferably structured with a negative slope to form in the space between the resist walls flanking channel walls comprising an electrode layer and rising above it a wall of insulating material with the electrode layer sides exposed to adjacent channels. Subsequently, the resist walls are removed by a lift-off process removing with it the layer deposits on the resist walls leaving behind the layer deposits between the resist walls. The remaining insulating walls are then covered with thin dielectric sheet-like member to form the plasma channels.

19 Claims, 3 Drawing Sheets

6,057,895

PLASMAS ADDRESSED LIQUID CRYSTAL DISPLAY WITH DEPOSITED PLASMA CHANNELS WITH TAPERED EDGES

RELATED APPLICATIONS

1) U.S. Application, Ser. No. 08/361078, filed Dec. 21, 1994 (5604-0375).
2) U.S. Application, Ser. No. 08/407536, filed Mar. 20, 1995 (5604-0379).
3) U.S. Application, Ser. No. 08/413052, filed Mar. 29, 1995 (5604-0382).

BACKGROUND OF INVENTION

This invention relates to plasma channels, and to plasma-addressed liquid crystal display panels commonly referred to as "PALC" display devices using such channels. These devices comprise, typically, a sandwich of: a first substrate having deposited on it parallel transparent column electrodes, commonly referred to as "ITO" columns or electrodes since indium-tin oxides are typically used, on which is deposited a color filter layer; a second substrate comprising parallel sealed plasma channels corresponding to rows of the display crossing all of the ITO columns and each of which is filled with a low pressure ionizable gas, such as helium, neon and/or argon, and containing spaced cathode and anode electrodes along the channel for ionizing the gas to create a plasma, which channels are closed off by a thin transparent dielectric sheet; and a liquid crystal (LC) material located between the substrates. The structure behaves like an active matrix liquid crystal display in which the thin film transistor switches at each pixel are replaced by a plasma channel acting as a row switch and capable of selectively addressing a row of LC pixel elements. In operation, successive lines of data signals representing an image to be displayed are sampled at column positions and the sampled data voltages are respectively applied to the ITO columns. All but one of the row plasma channels are in the de-ionized or non-conducting state. The plasma of the one ionized selected channel is conducting and, in effect, establishes a reference potential on the adjacent side of a row of pixels of the LC layer, causing each LC pixel to charge up to the applied column potential of the data signal. The ionized channel is turned off, isolating the LC pixel charge and storing the data voltage for a frame period. When the next row of data appears on the ITO columns, only the succeeding plasma channel row is ionized to store the data voltages in the succeeding row of LC pixels, and so on. As is well known, the attenuation of the backlight or incident light to each LC pixel is a function of the stored voltage across the pixel. A more detailed description is unnecessary because the construction, fabrication, and operation of such PALC devices have been described in detail in the following U.S. patents and publication, the contents of which are hereby incorporated by reference: U.S. Pat. Nos. 4,896,149; 5,077,553; 5,272,472; 5,276,384; and Buzak et al., "A 16-Inch Full Color Plasma Addressed Liquid Crystal Display", Digest of Tech. Papers, 1993 SID Int. Symp., Soc. for Info. Displ. pp. 883–886.

A cross-section of the PALC display described in the 1993 SID Digest is shown in FIG. 2. The method described in the referenced publication for making the plasma channels is to chemically etch a flat glass substrate to form parallel semi-cylindrically shaped recesses defined by spaced ridges or mesas and to bond on top of the mesas a thin dielectric cover sheet having a thickness in the range of about 30–50 μm.

In order to make the cover sheet of the plasma channel part more rigid, U.S. Pat. No. 5,214,521 proposed a construction in which the electrodes are deposited on a flat bottom plate while the top plate is etched back to form channels shaped as hemi-cylinders—the inverse of that shown in FIG. 2—in such a way that the remaining glass at the top of the channels is thin enough to allow addressing of the adjacent LC material. However, due to the circular curvature of the top plate, between the plasma discharge and the LC material, the glass thickness and thus the voltage drop over the LC material varies significantly for each pixel. In practical situations, this reduces the number of gray levels of the display.

U.S. Pat. No. 5,349,454 describes a construction wherein the electrodes are formed on a flat substrate, and on top of the electrodes are formed insulating ribs that constitute the lateral mesas or separating walls of each plasma channel, a flat thin dielectric sheet then being adhered to the tops of the ribs. This patent does not describe how the ribs are formed, but a commonly-assigned laid-open EPO application, No. 0 500 085 A2 describes a forming process as screen printing. This process has certain disadvantages. These disadvantages include: 1) high resolution may be difficult to obtain, and 2) uniform rib height may also be difficult to obtain.

SUMMARY OF INVENTION

An object of the invention is an improved channel plate.

A further object of the invention is an improved plasma-addressed display device.

Another object of the invention is an improved method for fabricating the plasma channels of a PALC display device.

In accordance with a first aspect of the invention, a channel plate comprises a dielectric substantially transparent substrate and a thin dielectric sheet-like member arranged over and spaced from the substrate by a plurality of flanking mesas each formed by a deposited electrically conductive layer and an electrically insulating material deposited on the electrically conductive layer. The height of the mesas above the substrate determine the height of the channels, which are each formed by the portion of the substrate surface extending between adjacent flanking mesas, the flanking mesas themselves, and the overlying portion of the thin dielectric sheet-like member. The term "deposited" as used herein means a layer formed by a vapor-deposition process from a gas or vapor with or without an involved chemical reaction, or by a sputtering or evaporation process.

In accordance with a first preferred embodiment of the invention, the channel plate is part of a PALC display device, and the combination of the substrate, deposited electrically conductive layers and deposited electrically insulating mesas, and the overlying thin dielectric sheet-like member constitutes the plasma channels or channel plate of the PALC display device. In this embodiment, the exposed side surfaces of the electrically conductive layers form the plasma electrodes for establishing when activated conductive plasmas in an appropriate gas filling within the plasma channels. An advantage is that each deposited electrode has an exposed surface in adjacent channels, and can function as an electrode for both channels, thereby reducing the number of independent electrodes required.

In accordance with a second aspect of the invention, the mesas constituted by the electrically conductive layers and the electrically insulating layers are formed by a depositing technique based on so-called lift-off. Lift-off is a common procedure in the manufacture of certain semi-conductor devices, especially of high electron mobility transistors (HEMT) in which the typical height of structures formed by lift-off is of the order of 1–2 μm. In contrast, for application in the fabrication of channel plates for PALC display device, the typical mesa height is several orders of magnitude larger, for example, 80–150 μm. As a consequence, the lift-off schemes known in the semi-conductor field are, as such, not suitable for the fabrication of channel plates and must accordingly be modified.

In accordance with a first preferred embodiment of the method of the invention, the lift-off technique is based on forming at the areas where the channels will exist spaced walls of a resist material extending to a height at least above the height of the deposited mesas to be formed. The resist walls preferably have a larger width at their tops than their width below their tops. The electrically conductive material and electrically insulating material are then deposited over the whole surface, covering only the wider tops of the resist walls and also depositing between the resist walls but spaced from the resist sides to form the desired mesas. Subsequently, the resist layers with their deposits of electrically conductive and electrically insulating material are removed by subjecting the substrate to a treatment to soften and dissolve the resist material.

An advantage of the resist walls with varying widths is that the initially deposited electrically conductive layers between the resist walls are slightly wider than the later deposited covering electrically insulating layers, which ensures that the sides of the electrically conductive layers will be exposed and can properly serve their electrical function.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention, like reference numerals or letters signifying the same or similar components.

DETAILED DESCRIPTION OF PREFERRED EMBODIMENTS

Figure 1:
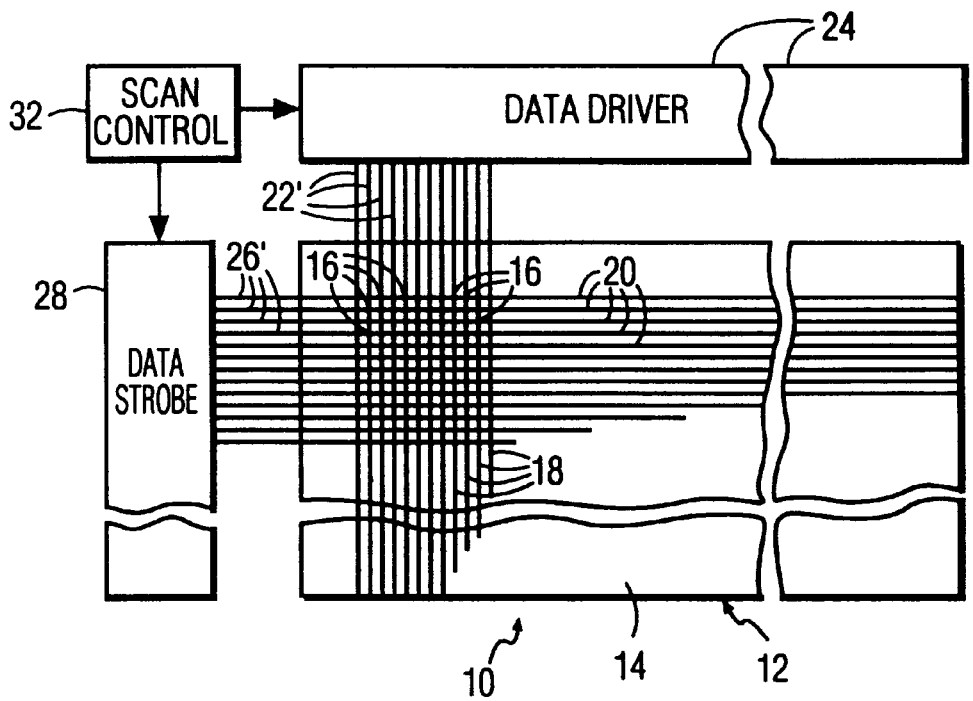
FIG. 1 is a schematic block diagram of a conventional flat panel display system.

FIG. 1 shows a flat panel display system 10, which represents a typical PALC display device and the operating electronic circuitry. With reference to FIG. 1, the flat panel display system comprises a display panel 12 having a display surface 14 that contains a pattern formed by a rectangular planar array of nominally identical data storage or display elements 16 mutually spaced apart by predetermined distances in the vertical and horizontal directions. Each display element 16 in the array represents the overlapping portions of thin, narrow electrodes 18 arranged in vertical columns and elongate, narrow channels 20 arranged in horizontal rows. (The electrodes 18 are hereinafter referred to from time to time as "column electrodes"). The display elements 16 in each of the rows of channels 20 represent one line of data.

The widths of column electrodes 18 and channels 20 determine the dimensions of display elements 16, which are typically of rectangular shape. Column electrodes 18 are deposited on a major surface of a first electrically nonconductive, optically transparent substrate 34 (FIG. 2), and the channel rows are usually built into a second transparent substrate 36. Skilled persons will appreciate that certain systems, such as a reflective display of either the direct view or projection type, would require that only one substrate be optically transparent.

Column electrodes 18 receive data drive signals of the analog voltage type developed on parallel output conductors 22' by different ones of output amplifiers 23 (FIG. 2) of a data driver or drive circuit 24, and channels 20 receive data strobe signals of the voltage pulse type developed on parallel output conductors 26' by different ones of output amplifiers 21 (FIG. 2) of a data strobe or strobe means or strobe circuit 28. Each of the channels 20 includes a reference electrode 30 (FIG. 2) to which a reference potential, such as ground, common to each channel 20 and data strobe 28 is applied.

To synthesize an image on the entire area of display surface 14, display system 10 employs a scan control circuit 32 that coordinates the functions of data driver 24 and data strobe 28 so that all columns of display elements 16 of display panel 12 are addressed row by row in row scan fashion as had been described. Display panel 12 may employ electro-optic materials of different types. For example, if it uses such material that changes the polarization state of incident light rays, display panel 12 is positioned between a pair of light polarizing filters, which cooperate with display panel 12 to change the luminance of light propagating through them. The use of a scattering liquid crystal cell as the electro-optic material would not require the use of polarizing filters, however. All such materials or layers of materials which attenuate transmitted or reflected light in response to the voltage across it are referred to herein as electro-optic materials. As LC materials are presently the most common example, the detailed description will refer to LC materials but it will be understood that the invention is not limited thereto. A color filter (not shown) may be positioned within display panel 12 to develop multi-colored images of controllable color intensity. For a projection display, color can also be achieved by using three separate monochrome panels 12, each of which controls one primary color.

Figure 2:
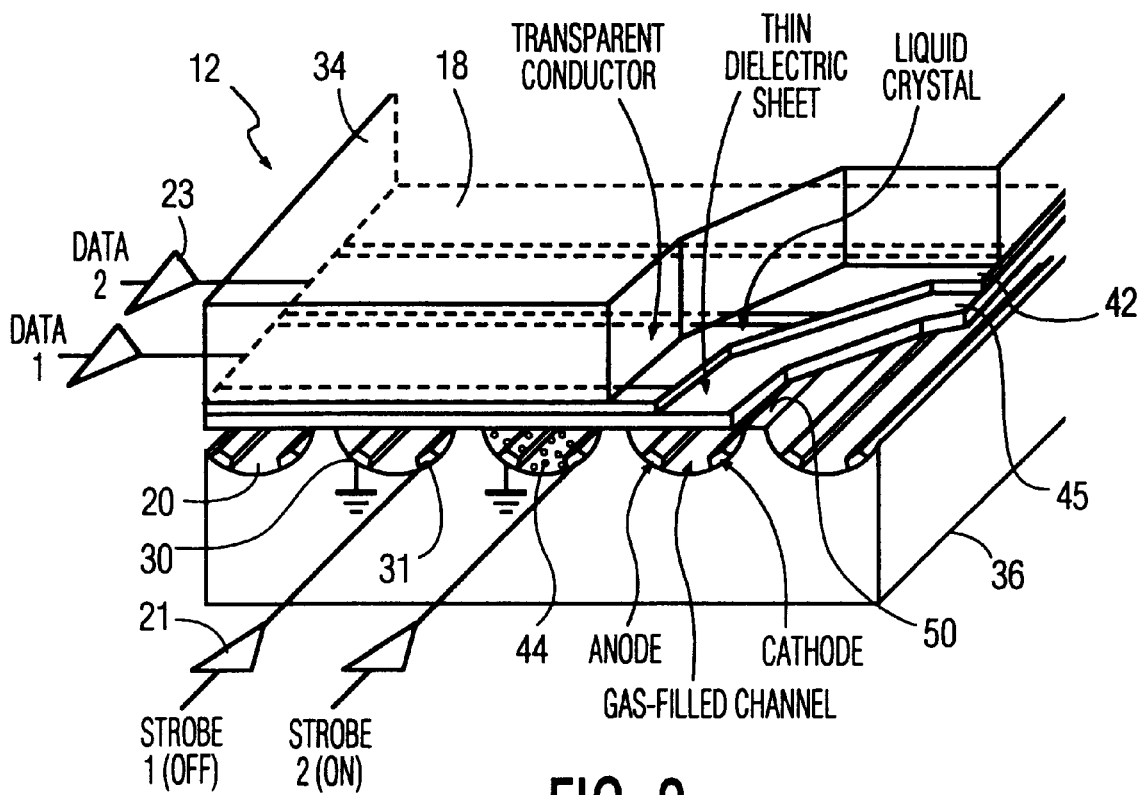
FIG. 2 is a perspective view of part of a conventional PALC display device.

FIG. 2 illustrates the PALC version of such a flat display panel using LC material. Only 3 of the column electrodes 18 are shown. The row electrodes 20 are constituted by a plurality of parallel elongated sealed channels underlying (in FIG. 2) a layer 42 of the LC material. Each of the channels 20 is filled with an ionizable gas 44, closed off with a thin dielectric sheet 45 typically of glass, and contains on an interior channel surface first and second spaced elongated electrodes 30, 31 which extend the full length of each channel. The first electrode 30 is grounded and is commonly called the anode. The second electrode 31 is called the cathode, because to it will be supplied relative to the anode electrode a negative strobe pulse sufficient to cause electrons to be emitted from the cathode 31 to ionize the gas. As explained above, each channel 20, in turn, has its gas ionized with a strobe pulse to form a plasma and a grounded line connection to a row of pixels in the LC layer 42 above. When the strobe pulse terminates, and after deionization has occurred, the next channel is strobed and turned on. Since the column electrodes 18 each cross a whole column of pixels, only one plasma row connection at a time is allowed on to avoid crosstalk.

Fabrication of a PALC device is typically done as described in the 1993 SID digest paper by providing first and second substrates 34, 36 with the first substrate 34 comprising a glass panel on which is vapor-deposited the ITO column electrodes 18, followed by color filter processing over the ITO electrodes to produce the RGB stripes (not shown), followed by the black surround processing and liquid crystal alignment processing. The second substrate 36, also a glass panel, is masked and etched to form the channels 20, following which the plasma electrode material is deposited and masked and etched to form the cathode 31 and anode 30 electrodes. A thin dielectric glass microsheet 45 is then sealed across the peripheral edges of the device to form with the ridges 50 the channels 20, which are then exhausted, back-filled with a lowpressure ionizable gas such as helium and/or neon and optionally with a small percentage of argon and sealed off. LC alignment of the exposed surface of the microsheet 45 is then carried out. The two assembled substrates are then assembled into a panel with the two LC alignment surfaces spaced apart and facing, the LC material 42 introduced into the space, and electrical connections made to the column electrodes 18 and plasma electrodes 30, 31.

Figure 3:
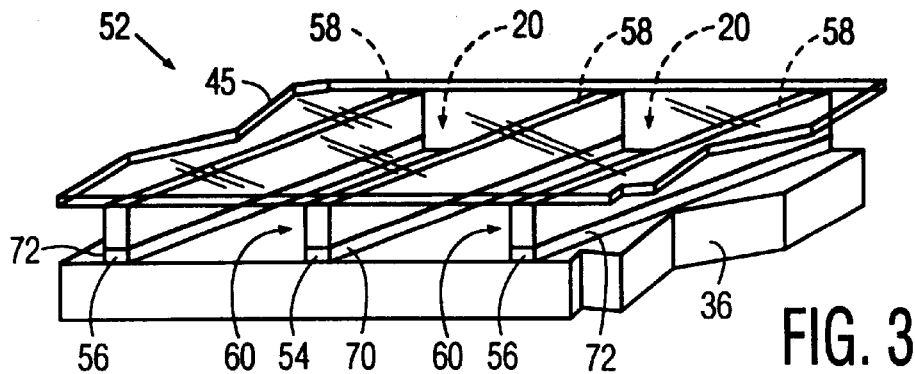
FIG. 3 is a perspective view and FIG. 4 a cross-section of a part of a channel plate of one form of a channel plate according to the invention for use in a PALC color display.
Figure 4:
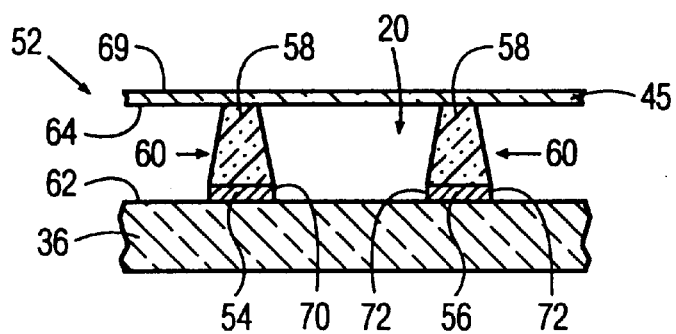

FIG. 3 is a perspective view and FIG. 4 a cross-section, both schematic, of one form of channel plate 52 in accordance with the invention for one form of liquid crystal display panel in accordance with the invention. A thick flat glass bottom plate 36 forms a substantially transparent dielectric substrate for the plasma channels 20. Over the bottom plate 36 is vapor-deposited spaced electrode layer portions 54, 56 followed by electrically insulating mesa wall portions 58 to form walls 60, on top of which is bonded a thin dielectric sheet-like member 45, for example, also of substantially transparent glass. The active channels 20 are formed by adjacent elongated cavities each flanked by side walls 60, a substantially flat substrate portion 62, and a substantially flat top wall portion 64 facing the bottom plate 62. The top plate 45 may be sealed along the tops of the side walls 60 in any known manner, for example, by means of fused glass frit to form the sealed plasma channels 20. Alternatively, the periphery of the top plate 45 (not shown) may be sealed to the periphery of the bottom plate 36 (not shown) to seal off the structure, the individual channels not being required to be sealed off as a common gas is used for all the channels. The outer surface 69 of the top part 45 interfaces with the LC layer (not shown). The exposed side surfaces of the electrically conductive layers form cathode 70 and anode 72 electrodes for each of the channels 20. The ragged lines at the edges of the elements in FIG. 2 indicate that what is shown is a small section broken off from a larger assembly, since, as will be appreciated, typically a PALC display device for monitor use would contain several hundred column electrodes 18 and several hundred plasma channels 20.

FIG. 4, for simplicity, is an idealized schematic drawing of a channel plate 52 comprising just two walls 60 defining one channel 20. It will be noted that the electrically insulating portion 58 of the side wall 60 is generally tapered, by which is meant that the upper part of the portion 58 is slightly narrower than the lower part adjacent the substrate 36, and that the lower part does not overlap or cover the sides of the electrically conductive layers 70, 72, which thus remain exposed and able to perform their function of igniting an electrically conductive plasma when suitable voltages are applied between the electrode portions 70, 72. This is an important feature of the invention. As will be elaborated on below, though the electrically insulating wall portions 58 are deposited to a relatively large height, nevertheless, the underlying side surfaces of the electrode portions 70, 72 are not covered up and remain exposed.

Figure 5:
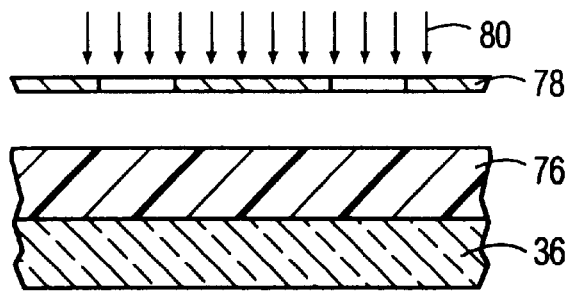
FIGS. 5–8 are schematic cross-sectional views similar to FIG. 4 showing various steps in the fabrication of the channel plate of FIG. 4 according to one form of the method of the invention.

The preferred technique for fabricating the substrate 36 with the side walls 60 is described in further detail below and in FIGS. 5–8 and is based on a lift-off scheme known generally from the semiconductor technology. The first step, shown in FIG. 5, is to lay down on the substrate 36 by conventional methods a thick layer 76 of a suitable positive resist. A suitable thickness, which depends on the size of the channels and/or resolution/pixel size, is between about 80–200 $\mu$m, preferably thicker than the height of the ultimate side walls 60 to be fabricated. The resist layer, depending on viscosity, can be spin-coated in one or more steps. Any of many well-known positive photoresists can be employed, such as PMMA (poly methyl meta acrylate), Hunt HPR, various Shipley resists, and so-called laminate resists. The resist layer after conventional baking is then exposed through a suitable mask 78 in a conventional manner to suitable radiation for thick resist layers, such as X-rays or high energy electron beam techniques, indicated in FIG. 5 by arrows 80. Conventional UV lithography techniques can also be employed, by using multiple resist layers. A positive resist, as is well known, undergoes depolymerization and softens where irradiated, and following subsequent conventional development will result in the irradiated portions being removed, leaving behind spaced rows or walls 80 (FIG. 6) of resist material approximately located where the channel cavities will be formed.

Figure 6:
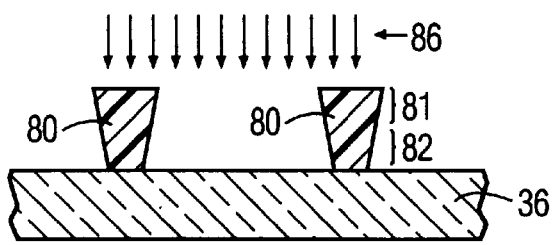

As is illustrated in FIG. 6, the resist walls 80 preferably have a wider portion at its top, indicated at 81 in FIG. 6, and a narrower portion 82 below. This structure will be referred to as a negative slope structure. This negative slope structure is preferred because of the height of the resist portions 80 and to ensure that the solvent which will later be supplied will be able to attack the resist over its entire height. The negative slope can be gradual as indicated in FIG. 6, or stepped as indicated at 84 in FIG. 6A.

The negative slope structure can be obtained in several ways. The negative slope in FIG. 6 can be obtained by providing at the glass substrate 36 a reflector for the exposing radiation, Alternatively, the resist/glass interface can also act as such a reflector. As a result, with a positive resist, the resist portions adjacent or closer to the substrate-reflector will receive more radiation and become over-exposed and during the development cycle will become selectively softened and thus more of the resist closer to the substrate-reflector will be removed. Alternatively, the resist layer can be applied as several layers with different baking steps provided for each layer. Thus, if the upper resist portions are baked harder than the lower resist portions, the lower resist portions will be softened faster during development than the upper resist portions. As a further alternative, resists with different lengths of polymers can be used to obtain the negative slope structure desired, as the different polymer lengths act differently to exposure.

Figure 6A:
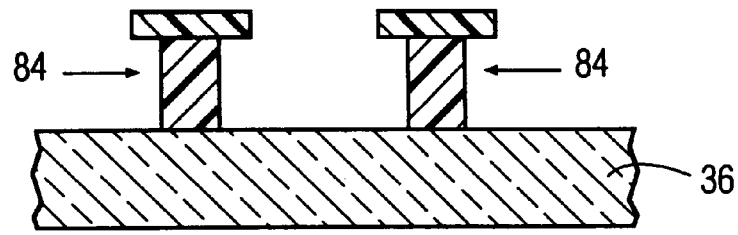

In the embodiment of FIG. 6A, the wider resist portion on top can be part of a first resist layer of lower sensitivity to the exposing radiation, whereas the narrower resist portion at the bottom can be part of a second resist layer of higher sensitivity to the exposing radiation. Hence, the lower resist portions are selectively depolymerized to a greater extent than the less sensitive upper resist portions, resulting after development in the negative slope resist structure depicted in FIG. 6A. A suitable thickness, as an example, of a 2-layer resist is a first layer of 75 μm and a second layer of 25 μm. Suitable examples of a resist material of higher sensitivity are PMMA with an average polymer length of about 120K, for example. Suitable examples of a resist material of lower sensitivity are PMMA with an average polymer length of about 950K, for example.

Yet another method for obtaining the negative slope structure is to use a negative photoresist. A negative photoresist hardens when exposed to UV light. By varying the intensity and exposure time of the UV light, the top portions of the exposed portions of the resist can be made harder than the bottom portions. Then, when the resist is developed, the bottom portions will etch more than the top portions, leading to the desired negative slope.

Figure 7:
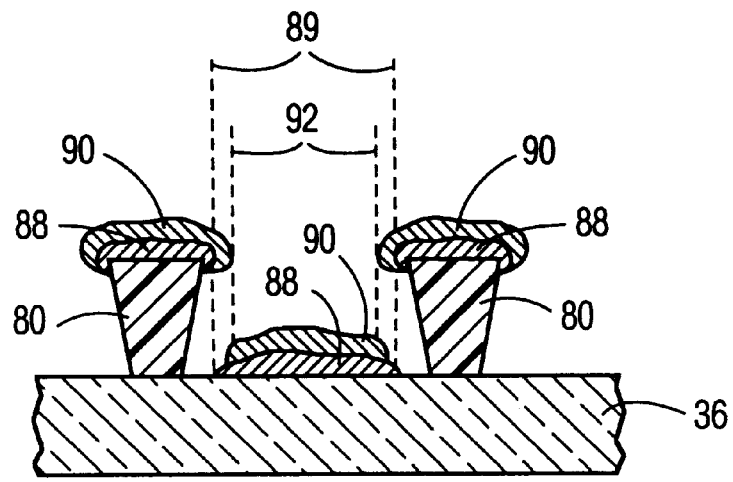
Figure 8:
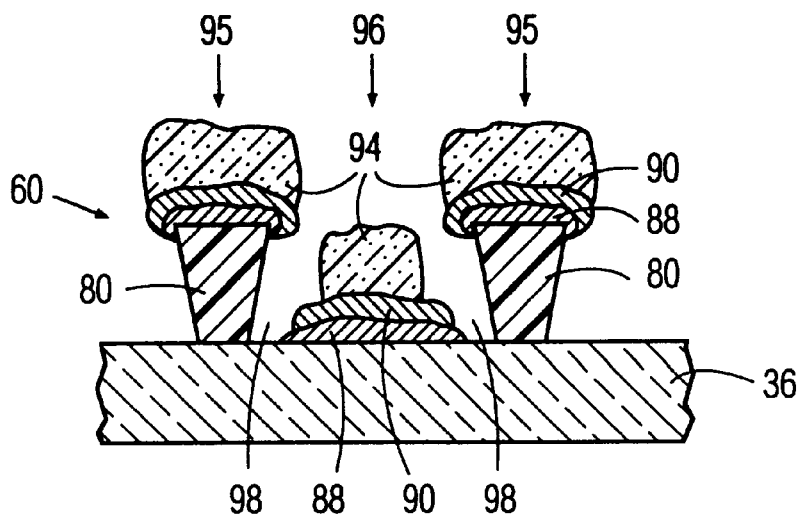

As indicated in FIG. 6 by the arrows 86, the electrode layers and electrically insulating wall portions are then deposited over the whole substrate surface. The results are depicted in FIGS. 7 and 8. FIG. 7 shows deposition of the electrode material, typically a metal such as copper, or layers of Cu—Cr—Cu, or other suitable metals, at different stages to illustrate how the resultant walls end up with a positive slope. Thus, layers 88 represent a first deposited layer. Note the shadow effect represented by the outer pair of vertical dashed lines 89. Hence, the layer portion 88 deposited on the substrate between the resist walls 80 has a certain width and is spaced from the sides of the resist walls 80. The subsequent deposits 90 of the metal are additionally shadowed by the initial deposits 88, represented by the inner pair of vertical dashed lines 92. Thus, as the electrode layer deposits build up, the increasing layer thickness on the resist walls causes the deposits between the resist walls to acquire a positive slope with the upper regions of narrower width than that of the lower regions, the reverse geometry of the resist configuration. When the electrode deposits have reached the desired thickness, which depends on the resistance desired, typically 2–8 μm, which can go as high as the mesa height, if desired, the process continues with deposition of the insulating portion of the side walls 60. The same shadowing effect occurs with the result that the insulating deposits 94 between the resist walls are also of decreasing width as the deposit builds up. The insulating material used may be of any suitable insulating material and are typically opaque. Examples are silicon oxide, silicon nitride, and aluminum oxide, materials typically used in the semiconductor art. Typical thickness is about 80–150 μm, depending on pixel size. For example, for a pixel size of 318 μm, a 100 μm combined thickness of the walls 60 including the electrode layer and the insulating layer is suitable. Smaller thicknesses may also be used. FIG. 4 shows the gradually tapering shape with a positive slope of the resultant channel side walls 60. This shape, as noted above, ensures that the electrode side surfaces remain exposed to the gas in each channel.

Following deposition of the electrode and insulating layers, the resist walls with their overlays of deposited material 95 are readily removed by the lift-off process, which simply involves subjecting the assembly to the action of a solvent for the resist, acetone as an example being a commonly used solvent for many of such organic resists. The solvent can attack the resist 80 via the spaces 98 between the resist side surfaces and the deposits 96 and thus dissolves the underlying resist and the superposed layers are readily washed away leaving behind just the electrode layers and insulating deposits designated 96, which then become the desired side walls 60 of FIG. 4.

All of the methods described in the referenced patents and publication will be suitable for making the remaining parts of the panel of the invention.

Other advantages of the invention are that only one lithographic step is needed, represented by the mask 78 in FIG. 5. Moreover, more accurate control of the height of the walls 60 is achieved via deposition, as by vapor-deposition, sputtering, or evaporation, than by, for example, screen printing.

The invention is generally applicable to all kinds of flat displays, and in particular to displays of the plasma-addressed type, especially PALC displays that typically have a small channel pitch for use in computer monitors, workstations or TV applications. While the main application of the channel plate of the invention is in PALC type display devices, the same construction can also be used as a plasma display device where the output is the light, generated by the plasma, which can exit the device via the transparent substrate and/or the overlying transparent sheet-like member.

Several preferred examples for the FIG. 3 embodiment are (all values are in μm): a mesa width of about 20–50; a mesa height of about 50–160; and a mesa pitch of about 200–500.

It will be appreciated that the drawing figures are not to scale and in particular the channel widths have been exaggerated to show the electrodes.

Still further, while the channels in the substrate are typically straight, the invention is not limited to such a configuration and other channel shapes, such as a meandering shape, are also possible within the scope of the invention.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A channel plate for a flat display comprising elongated channels on a dielectric member, and electrode surfaces provided in each of the channels, said dielectric member comprising a dielectric substrate, said elongated channels, provided with electrode surfaces, comprising channel-defining planar flanking walls comprising elongated electrode layer portions on the substrate and elongated insulating layer portions on the electrode layer portions, characterized in that the insulating layer portions are aligned parallel with the electrode layer portions, are deposited on top of the electrode layer portions, are contiguous with essentially top surfaces of the electrode layer portions while not overlapping side surfaces of the electrode layer portions and are tapered in a direction away from the top surfaces, whereby the side surfaces of the electrode layer portions are exposed to the channels between adjacent flanking walls.

2. A channel plate as claimed in claim 1, wherein the dielectric substrate is constituted of glass.

3. A channel plate as claimed in claim 1, wherein the flanking walls have a generally tapered shape with a positive slope.

4. A plasma channel plate for use in a PALC display device comprising elongated channels on a substantially transparent dielectric substrate and electrode surfaces provided in each of the channels, characterized in that:

a) a plurality of elongated spaced electrically conductive electrode layer portions are provided on the substrate, b) an elongated electrically insulating layer portion is provided on each of the electrode layer portions, the electrically insulating layer portion aligned parallel with the electrode layer portions, contiguous with essentially entire top surfaces of the electrode layer portions while not overlapping side surfaces of the electrode layer portions, c) each of the electrode layer portions and insulating layer portions provided there upon forming an essentially planar wall and two adjacent walls defining one of the channels, said channels being covered by a thin dielectric sheet-like member, d) substantially each of the electrode layer portions forming exposed layer portions in adjacent channels and e) each of the insulating layer portions being tapered in a direction away from the top surfaces.

5. A plasma channel plate as claimed in claim 4, wherein each of the walls have a generally tapered shape with a positive slope.

6. A plasma channel plate as claimed in claim 5, wherein the walls have a width of about 20–50 $\mu$m, a height of about 50–160 $\mu$m, and a pitch of about 200–500 $\mu$m.

7. A plasma-addressed display device comprising a layer of electro-optical material between a first substrate comprising data electrodes and a channel plate as claimed in claim 4.

8. In a method for making a channel plate for a flat display device, said method being characterized in that:

(a) providing a substantially transparent dielectric substrate, (b) forming on the substrate a plurality of spaced walls of resist material each having a first height, a lower portion adjacent the substrate and an upper portion remote from the substrate that is wider than the lower portion, (c) depositing an electrically conductive material over the substrate to form on the substrate electrode layer first portions between the resist walls and spaced therefrom and on the resist wall tops electrode layer second portions, (d) depositing an electrically insulating material over the substrate to form on the electrode layer first portions insulating layer third portions and to form on the electrode layer second portions insulating layer fourth portions, (e) subjecting the resist walls to a process that enables the resist walls to be lifted-off the substrate together with the second and fourth portions leaving behind on the substrate the first and third portions.

9. The method of claim 8, wherein the resist material is a positive resist.

10. The method of claim 9, wherein the resist walls have a negative slope.

11. The method of claim 10, wherein the first and third portions have a positive slope.

12. The method of claim 8, wherein the first height is at least 80 $\mu$m.

13. The method of claim 8, wherein step (e) is carried out by subjecting the resist walls to a solvent that dissolves the resist material.

14. The method of claim 9, wherein step (b) is carried out by providing a first resist layer of given radiation-sensitivity and on the first resist layer a second resist layer of radiation-sensitivity lower than said given radiation-sensitivity.

15. The method of claim 9, wherein step (b) is carried out by subjecting a resist layer to a first radiation capable of hardening mainly a first portion of the resist adjacent the substrate and subjecting the resist layer to a second radiation capable of hardening mainly a second portion of the resist remote from the substrate.

16. The method of claim 9, wherein step (b) is carried out by subjecting a resist layer to radiation capable of hardening the resist under conditions such that reflection of the radiation occurs tending to increase the exposure of resist portions adjacent the substrate.

17. The method of claim 8, wherein the resist is a negative resist.

18. The method of claim 17, wherein step (b) is carried out by subjecting a resist layer to radiation at an intensity and for a time such that top portions of the resist are made harder than bottom portions of the resist.

19. In a method for making the plasma channel plate of a plasma-addressed electro-optic display device comprising a layer of electro-optic material, data electrodes coupled to the electro-optic layer and adapted to receive data voltages for activating portions of the electro-optic layer, a plurality of elongated plasma channels extending generally transverse to the data electrodes for selectively switching on said electro-optic portions, and a dielectric sheet closing off the plasma channels on the side facing the data electrodes, said plasma channels each comprising spaced elongated cathode and anode plasma electrodes and an ionizable gas filling, said method being characterized in that:

(a) providing a substantially transparent dielectric substrate, (b) forming on the substrate a plurality of spaced walls of resist material each having a first height, a lower portion adjacent the substrate and an upper portion remote from the substrate that is wider than the lower portion, (c) depositing an electrically conductive material over the substrate to form on the substrate electrode layer first portions between the resist walls and spaced therefrom and on the resist wall tops electrode layer second portions, (d) depositing an electrically insulating material over the substrate to form on the electrode layer first portions insulating layer third portions and to form on the electrode layer second portions insulating layer fourth portions, (e) subjecting the resist walls to a process that enables the resist walls to be lifted-off the substrate together with the second and fourth portions leaving behind on the substrate the first and third portions, (f) disposing over the third portions a thin dielectric sheet-like member.

* * * * *